United States Patent [19]

Robb et al.

[11] Patent Number: 5,431,956
[45] Date of Patent: Jul. 11, 1995

[54] COATED INORGANIC PARTICLES

[75] Inventors: John Robb, Fairfield; Guy Decelles, Eaglescliffe, both of England

[73] Assignee: Tioxide Group Services Limited, London, England

[21] Appl. No.: 261,964

[22] Filed: Jun. 17, 1994

Related U.S. Application Data

[62] Division of Ser. No. 59,757, May 21, 1993, abandoned.

[30] Foreign Application Priority Data

May 29, 1992 [GB] United Kingdom .................. 9211420
Jul. 22, 1992 [GB] United Kingdom .................. 9215599

[51] Int. Cl.$^6$ ............................................. B05D 7/00
[52] U.S. Cl. ..................... 427/220; 427/212; 427/215; 427/217; 427/221
[58] Field of Search ............... 427/212, 215, 220, 221, 427/217

[56] References Cited

U.S. PATENT DOCUMENTS

| | | |
|---|---|---|
| 3,133,893 | 5/1964 | Newman . |
| 3,519,594 | 7/1970 | Michaels ................ 260/41 |
| 3,544,500 | 12/1970 | Wilford et al. . |
| 3,884,871 | 4/1975 | Herman et al. ........... 427/221 |
| 3,897,586 | 7/1975 | Coker ..................... 428/403 |
| 4,544,684 | 10/1985 | Dumoulin et al. .......... 523/136 |
| 4,608,401 | 8/1986 | Martin ................... 523/205 |
| 4,771,086 | 9/1988 | Martin ................... 523/205 |
| 4,935,456 | 6/1990 | Huang et al. ............ 427/213.34 |
| 4,981,882 | 1/1991 | Smith et al. ............ 523/205 |
| 5,032,425 | 7/1991 | Livsey et al. ........... 427/211 |
| 5,171,772 | 12/1992 | Hoy et al. ............... 524/457 |

FOREIGN PATENT DOCUMENTS

| | | |
|---|---|---|
| 0054832 | 6/1982 | European Pat. Off. . |
| 58-153950 | 9/1983 | Japan . |
| 1057268 | 3/1989 | Japan . |
| 1184034 | 7/1989 | Japan . |
| 1025694 | 4/1966 | United Kingdom . |
| 1061982 | 3/1967 | United Kingdom . |
| 1146544 | 3/1969 | United Kingdom . |
| 1172513 | 12/1969 | United Kingdom . |
| 1369468 | 10/1974 | United Kingdom . |
| 1506236 | 4/1978 | United Kingdom . |

*Primary Examiner*—Shrive Beck
*Assistant Examiner*—David M. Maiorana
*Attorney, Agent, or Firm*—Baker & Botts

[57] ABSTRACT

A novel inorganic particulate powder coated with an organic polymer is claimed. The product is obtainable by dispersing in water inorganic particles at a pH higher than their isoelectric point in the presence of a polymeric polybasic acid as a dispersing agent to produce particles having a modified isoelectric point. The pH of the dispersion is then adjusted to a value below 9 but above the modified isoelectric point and an ethylenically unsaturated monomer is polymerized in the presence of the dispersion so as to coat the inorganic particles with polymerized monomer. A method for forming the particles is also claimed.

The particles prepared by the method have been shown to be uniformly and discretely coated with an organic polymeric coating and can be used in many applications where it is desired to disperse inorganic particles in organic media such as paints, inks and plastics compositions.

26 Claims, No Drawings

COATED INORGANIC PARTICLES

This application is a division of application Ser. No. 08/059,757, filed May 12, 1993, now abandoned.

This invention relates to coated inorganic particles and in particular to particles with a polymeric organic coating.

Inorganic powders in which the particles are encapsulated by a polymeric organic coating are generally known. A useful property associated with encapsulated inorganic powders is that the encapsulating coating is believed to aid incorporation of the inorganic powders into polymeric media such as paints and plastics in which they are utilised as pigments and fillers. It is important that the encapsulated particles should disperse easily and a uniform polymeric coating is believed to assist in preventing agglomeration of the particles.

It is an object of this invention to provide inorganic particles which are uniformly and discretely coated with an organic polymeric coating.

Further, in pigmented polymer compositions, for example liquid coating compositions of the type known as latex paints or emulsion paints, the basis of the paint comprises an aqueous emulsion of a film-forming polymer or copolymer and pigment particles. Generally, these pigment particles are poorly dispersed and remain outside the polymer particles even when these coalesce to form a dry paint film. Such paints are finding increasing use because they are environmentally acceptable.

It is known that the opacity or hiding power of a latex paint depends to some extent upon the efficiency of dispersion of the pigments within the paint and the opacity is increased if aggregation of pigment particles can be minimised.

In known methods for encapsulation of pigmentary particles by a variety of polymers the uniformity of coating and discreteness of the coated particles is generally not satisfactory and significant aggregation of the particles is still observed.

It is a further object of this invention to provide a coating composition comprising a dispersion of inorganic particles which are uniformly and discretely coated with a film-forming polymer so as to optimise spacing of the inorganic particles in a dried film prepared from the dispersion.

According to the invention a coated inorganic powder comprises particles of an inorganic material coated with a polymeric organic material obtainable by dispersing the inorganic particles in water at a pH value higher than the isoelectric point of the particles in the presence of a dispersing agent comprising a polymeric polybasic acid or a salt thereof to produce particles having a modified isoelectric point, adjusting the pH of the dispersion to a value below 9 but above the modified isoelectric point of the particles and polymerising in the presence of the dispersion so produced an ethylenically unsaturated monomer so that said particles are coated with polymerised monomer.

It is believed that the particles according to the invention comprise a coherent inner coating formed from the dispersing agent which provides a key for an outer coating formed from the ethylenically unsaturated monomer or becomes incorporated into the polymeric coating during polymerisation although this description of the coated particles is not intended to limit the scope of the invention to particles having such a structure.

Also according to the invention a process for producing coated inorganic particles comprises suspending particles of an inorganic powder in water at a pH value higher than the isoelectric point for the particles in the presence of a dispersing agent comprising a polymeric polybasic acid or a salt thereof to produce particles having a modified isoelectric point, adjusting the pH of the dispersion to a value below 9 but above the modified isoelectric point of the particles and polymerising in the presence of the dispersion so produced an ethylenically unsaturated monomer so that said particles are coated with polymerised monomer.

The dispersing agents which find use in the invention are polymeric polybasic acids or their salts and include polysulphonic acids and their salts, polyphosphonic acids and their salts and polycarboxylic acids and their salts. When salts are employed the acids may be partially or fully neutralised and typical salts are the alkali metal salts or ammonium salts.

Useful polysulphonates include lignosulphonates, petroleum sulphonates and poly(styrene sulphonates) such as poly(sodium 4-styrene sulphonate).

Preferably the dispersing agent is a polycarboxylic acid or a salt thereof and examples of such dispersing agents are polymaleic acids and salts, polyacrylic acids and salts, substituted acrylic acid polymers, acrylic copolymers, sodium and/or ammonium salts of acrylic copolymers. Dispersing agents derived from acrylic acids are typified by polyacrylic acid itself and sodium of ammonium salts thereof as well as copolymers of an acrylic acid with other suitable monomers such as sulphonic acid derivatives, for example, 2-acrylamido, 2-methyl propane sulphonic acid. Comonomers polymerisable with the acrylic acid or the substituted acrylic acid can also contain a carboxyl grouping.

Usually the dispersing agents have a molecular weight of from 1000 to 10,000 and are substantially linear molecules.

The particles which can be employed in the present invention can be particles of any inorganic powder but those of particular interest are the inorganic pigments, extenders and fillers. Particularly, inorganic pigments are found to be of most use and such pigments are titanium dioxide pigments, zinc oxide pigments, aluminium oxide pigments, antimony oxides, barium pigments, calcium pigments, zirconium pigments, chromium pigments, iron pigments and magnesium pigments. Extenders and/or fillers such as silica, silicates, aluminates and particularly the clays can also be utilised in the invention. Mixtures of pigments and extenders can also be used as well as non-pigmentary forms of the inorganic powders mentioned as pigments. The most preferred inorganic powder is titanium dioxide pigment, preferably rutile titanium dioxide.

The particles may be uncoated but may also carry an inorganic coating. For example, titanium dioxide pigments which have been coated with silica and/or alumina can be used. Commercially available titanium dioxide pigments are usually coated with inorganic oxides and such pigments can readily be convened to the products of this invention by means of the process described herein.

The size of the particles used in the process of the invention is not critical provided that a stable aqueous dispersion of the particles can be prepared. For example, particles of titanium dioxide having an average size of from 0.01 micron to about 5 micron can be used in the process of the invention. Frequently, however, the coated inorganic particles of the invention are employed as pigments. Preferably, therefore, the particles have a size which optimises their pigmentary effect. When the particles are of pigmentary titanium dioxide they preferably have a size of from 0.1 to 0.4 micron.

The inorganic particles of the invention are coated with a polymer of an ethylenically unsaturated monomer. Any ethylenically unsaturated monomer which is polymerisable in an aqueous polymerisation system can be used in the present invention. Desirably, the polymer produced is insoluble in water and, if necessary, may be cross-linked by a suitable cross-linking agent. Typical ethylenically unsaturated monomers are aliphatic or aromatic compounds containing a polymerisable unsaturated group such as the unsaturated carboxylic adds or unsaturated carboxylic acid esters. One of the carbon atoms forming the double bond can preferably carry two hydrogen atoms and such compounds are called vinyl monomers. Typical useful monomers are acidic monomers such as acrylic acid, methacrylic acid, itaconic acid, maleic acid or its anhydride, fumaric acid and crotonic acid. Esters of acid monomers can be used such as methyl acrylate, ethyl acrylate, methyl methacrylate, butyl acrylate and ethyl methacrylate. Other monomers which can be polymerised to form coatings are styrene, vinyl toluene, alpha methylstyrene, ethylene, vinyl acetate, vinyl chloride, acrylonitrile, and the like. Fluorinated monomers such as fluorinated alkenes, fluorinated ethers, fluorinated acrylic and methacrylic acids and esters thereof or fluorinated heterocyclic compounds are also useful.

If desired a copolymer of two or more of the polymerisable monomers can be present.

In one useful embodiment of the invention the polymer which encapsulates the inorganic particles is a film-forming polymer. A dispersion of such particles can be employed as a coating composition in which the encapsulating polymer coalesces to form a film in the dried coating. The conditions used in the process of the invention can be adjusted to produce such a dispersion directly. The term "film-forming" is used herein to describe a polymeric composition which is capable of coalescing to form a coherent film containing the inorganic particles when an aqueous dispersion of coated inorganic particles which is a product of the invention is applied to a substrate and the water contained therein is allowed to evaporate. The film-forming polymers with which the inorganic particles are coated in carrying out this embodiment of the process of the invention include those which form a film at a temperature above ambient temperatures, for example at temperatures up to about 60° C. Preferably, however, the film-forming polymers have a minimum film-forming temperature below about 25° C. and therefore do not require heating to form a coherent film at normal ambient temperatures.

The ethylenically unsaturated monomers which are of particular use in forming film-forming polymers useful in this invention include, for example, unsaturated carboxylic acids and unsaturated carboxylic acid esters. Typical useful monomers are methyl acrylate, ethyl acrylate, butyl acrylate, butyl methacrylate, vinyl acetate and vinyl isobutylether.

Film-forming polymers can comprise a copolymer of two or more monomers such as the above but the copolymer can also include monomers whose homopolymer has a high minimum film-forming temperature such as styrene, methyl methacrylate, acrylonitrile, vinyl chloride and fluorinated monomers.

A cross-linking agent can be present in the monomer mixture used in the process of the invention and typical cross-linking agents are di- or poly-functional ethylenically unsaturated monomers, for example, ethylene glycol dimethacrylate, ethylene glycol diacrylate, allyl methacrylate, allyl acrylate, 1,3-butanediol diacrylate, divinyl benzene or 1,3-butanediol dimethacrylate. When a cross-linking agent is present the amount of the agent is usually within the range of 1% to 20% by weight of said agent on weight of total monomer employed and preferably the amount of cross-linking agent is from 1 to 10% by weight of monomer.

The mount of polymer present on the coated particles of the invention can vary considerably depending upon the intended use for the particles. The amount may be very small so that substantially only a monolayer of polymer is present or the weight of polymer can be as much as 200% of the weight of the uncoated inorganic particles. Typically the weight of polymer is from 0.1 to about 100% of the weight of uncoated particle but preferably the polymer represents at least 0.5% by weight and particles containing from 2% to about 20% polymer by weight with respect to uncoated particles are very useful.

When the inorganic particles are coated with a film-forming polymer which is intended for use in a coating composition the amount of polymer will vary depending upon the effect which it is desired will be achieved in the final dried film. When the coating composition is intended for producing a matt film then the ratio of inorganic particles to polymeric coating is higher than when the coating composition is intended for producing a glossy film. An important factor affecting the appearance of the film is the volume ratio of inorganic particles to encapsulating polymeric coating which is usually from 1:1 to 1:25 by volume and preferably the volume ratio is from 1:2 to 1:8.

In the process of the invention the inorganic particles are dispersed in water at a pH value above the isoelectric point of the particles. The isoelectric point is dependent upon the composition of the inorganic particles but generally the dispersion is formed at a pH above 7. In the preferred embodiment in which the inorganic particles are titanium dioxide the pH is preferably 9 to 11.

The dispersion is formed in the presence of a dispersing agent as hereinbefore described. The particles may be added to a solution of the dispersing agent or the dispersing agent can be added to a mixture of water and inorganic particles. The mixture is agitated by any suitable means for sufficient time to ensure maximum dispersion of the particles.

The amount of dispersing agent used is generally between 0.05 and 5 percent with respect to weight of inorganic powder and preferably is between 0.1 and 1 percent.

In order to reduce aggregation in the finished product of the invention it is advisable to subject the dispersion to a milling process to remove any aggregates already present. Any suitable milling process can be utilised but the use of a sand mill of the type commonly employed in the pigment industry is preferred.

The dispersing agent interacts with the inorganic particles and has the effect of changing the isoelectric point of the particles.

After milling, if necessary, it is advantageous to add more dispersing agent. Then the pH value of the dispersion is adjusted to a pH value below 9 but above the value of the modified isoelectric point. Preferably, the pH is adjusted to between 0.5 and 6 pH units above the modified isoelectric point and more preferably to between 3 and 5 pH units above this isoelectric point.

When the inorganic particles are titanium dioxide the pH value of the dispersion is usually adjusted to between 5 and 8.5 and preferably to between 6 and 8.

The polymerisation is carried out by adding one or more monomers to the dispersion at the selected pH. Usually, the monomer is added as a dispersion in water and, conveniently, this monomer dispersion is obtained by stirring a mixture of water and monomer.

Where a cross-linking agent for the chosen monomer is used then this usually, but not always, will be added to the dispersion of inorganic particles at the same time as the ethylenically unsaturated monomer.

Generally it is necessary to initiate the polymerisation and initiation can be suitably achieved with an initiator such as a peroxy compound, a persulphate, a peracetate or a redox initiator, e.g. a salt of a persulphuric acid or an organic hydroperoxide or peroxide in combination with a sulphite, bisulphite, hydrosulphite or metal formaldehyde sulphoxylate. The initiator can be added at any suitable stage, e.g. prior to the addition of the monomer to the inorganic powder or only a pan of the required amount of the initiator can be added initially followed by the remaining necessary amount or amounts at one or more later stages. In the most preferred process the initiator is added separately but simultaneously with the monomer.

Alternatively, the polymerisation may be initiated by exposing the reaction mixture to a source of gamma radiation such as a Cobalt-60 source.

The rate at which monomer is added to the dispersion of inorganic particles can vary quite widely but in the most preferred method the monomer addition rate is less than the rate at which the monomer is consumed by polymerisation. This technique, known as "starvation polymerisation" ensures that there is substantially no free monomer present in the reaction vessel during the polymerisation. It is believed that the "starvation polymerisation" method minimises the formation of free polymer not present as a coating on the inorganic particles and helps to produce a uniform coating on the inorganic particles.

The polymerisation of the monomers is usually carried out at an elevated temperature, e.g. up to 140° C. Typically, a temperature between 30° C. and 100° C. is employed and preferably the temperature is between 55° C. and 95° C. The polymerisation normally, but not always, is effected under an inert atmosphere, for example, under a protective atmosphere of an inert gas, e.g. nitrogen.

Advantageously, at least a part of the polymerisation is effected whilst subjecting the dispersion of inorganic particles to the effect of ultrasonic vibrations.

A convenient form in which to employ the products of the invention when they are intended for use in aqueous systems is as a dispersion which is the direct product of the process of the invention. However, they may also be converted to a dry powder by conventional means such as spray drying.

The coated particles of the invention are of use in a variety of applications. The encapsulating coating assists their dispersion in organic media and they are typically useful as opacifiers and extenders for paints, inks and plastics.

The encapsulating coatings which are formed on the inorganic particles in the process of the invention are especially uniform and coherent and the particles are substantially free from aggregation. Dispersion of the particles in organic media is therefore particularly efficient. One particular use of the products of the invention is as pigments in aqueous emulsion paints which are being used in increasing quantities because of their environmental acceptability.

When the encapsulating coating is prepared from a film-forming polymer a dispersion of the inorganic particles in water can be employed as a coating composition. Since each inorganic particle is individually and discretely encapsulated in a polymeric coating the spacing between particles is largely determined by the thickness of this layer when the water in which they are dispersed is removed. This spacing is substantially maintained even when the film-forming polymer coalesces to form a dried coating. Hence it is possible to utilise the opacifying power of pigments such as titanium dioxide more efficiently than is possible in conventional coatings.

The invention is illustrated by the following examples.

EXAMPLE 1

500 grams of a commercially available acrylic copolymer dispersant sold under the Trade Name Dispex GA40 was added to 240 liters of water. To the resulting solution, 200 kg of uncoated pigmentary titanium dioxide was added. The pH was then adjusted to 10 with sodium hydroxide and the dispersion thus produced was sandmilled for 1 hour. Subsequently the dispersion was diluted to 250 grams of titanium dioxide per liter and a second aliquot (500 grams) of dispersant was added. The dispersion was stirred for 10 minutes to ensure thorough mixing before the pH was adjusted to 8.5 with acetic acid.

In a separate tank, a monomer mixture of water (76 kg), methyl methacrylate (5 kg) and methacrylic acid (1 kg), was prepared and the pH was adjusted to 5 with ammonium hydroxide. In a third tank an initiator solution was formed from 100 grams of potassium persulphate and 10 liters of water.

The monomer mixture was added to the pigment slurry over 4 hours at a temperature of 70°±5° C. with stirring under an atmosphere of nitrogen. Addition of the initiator commenced at the same time as addition of the monomer mixture but continued for a total of 5 hours.

Upon completion of the additions, the batch was cooled to 30° C. and the product discharged from the reactor as a slurry.

The material produced was found to have the following properties

| Particle size | 0.38 micron |
|---|---|
| % Polymer | 3.3 |
| Bulk Density | 1.06 |
| Polymer Thickness | 0.005–0.01 micron |
| Tint Reducing Power | 1850 |

Examination under an electron microscope showed that the polymeric coating was extremely uniform and the coated particles were substantially discrete.

EXAMPLE 2

A slurry of titanium dioxide pigment was prepared by dispersing 357 g of pigment (uncoated pigmentary titanium dioxide) in 615 mls of water. The pH was adjusted to 10.5 using sodium hydroxide solution and dispersion was effected by addition of 1.0 g of the commercial polyacrylate dispersant sold under the Trade Name 'Dispex GA40'. The resulting slurry was sandmilled for 1 hour after which the pH was reduced to 8 and the slurry heated to 70° C.

To the slurry was added, simultaneously, a monomer emulsion and an initiator solution. The monomer emulsion consisted of 254 g ethyl acrylate, 172 g methyl methacrylate, 4.3 g methacrylic acid, 1 g 'Dispex GA40' and 215 g of water. 20 mls of aqueous initiator solution were used which contained 15 g of ammonium persulphate. The addition of monomer and initiator continued over 5 hours after which the suspension was cooled to room temperature. The product was found to comprise (by weight); $TiO_2$ 23.6%, polymer 21.7% and water 54.7%.

The suspension was removed from the reaction vessel and drawn down on paint charts in order to determine contrast ratio (a measure of opacity). The Contrast Ratio at 20 $m^2/l$ was 88.05.

EXAMPLE 3

A slurry of titanium dioxide was prepared by dispersing uncoated pigmentary titanium dioxide in water at a concentration of 500 grams per liter. The pH of a 500 ml portion of this slurry was adjusted to 10.5 with sodium hydroxide solution and 0.1% by weight of a polyacrylate dispersant (Dispex GA40) was added. The slurry was then sandmilled until the mean particle size was 0.50 micron and the pH was adjusted to 8.

The slurry was placed in a 2 liter reactor equipped with a stirrer, a condenser and inlet points for monomer and initiator and heated to 90° C. When the temperature had stabilised, a monomer emulsion and an initiator solution were simultaneously, but separately, added over 5 hours. The monomer emulsion comprised; 8.25 g styrene, 0.34 g methacrylic acid, 0.6 g polyacrylate dispersant (Dispex GA40) and 183.3 g water. The initiator solution consisted of 0.6 g of potassium persulphate in 20 ml of water. At the end of the five hour period the material was discharged from the reactor and allowed to cool. A sample submitted for transmission electron microscopy was seen to have a generally smooth coating thickness of between 4 nm and 10 nm.

The dispersion was agitated ultrasonically for 1 minute and the average particle size was found to be 0.57 micron indicating that no significant aggregation had taken place during the encapsulation process.

EXAMPLE 4

A zinc oxide pigment (Zinc Oxide 100 from Durham Chemicals) with a crystal size of 0.1 micron and a measured average particle size of 1.37 micron was encapsulated using the following process. Zinc oxide was dispersed at a concentration of 500 grams per liter on a high speed impeller mill for one hour at pH 9 in the presence of 0.1% by weight of a polyacrylate dispersant (Dispex GA40). One liter of the dispersed slurry was placed in a 2 liter reactor equipped with a stirrer, a condenser and inlet points for monomer and initiator. The slurry was heated to 70° C. When the temperature had stabilised, a monomer emulsion and an initiator solution were simultaneously, but separately, added over 5 hours. The monomer emulsion comprised; 14.4 g methyl methacrylate, 0.6 g methacrylic acid, 1.3 g polyacrylate dispersant (Dispex GA40) and 184 g water. The initiator solution consisted of 0.6 g of potassium persulphate in 20ml of water.

At the end of the five hour period the material was discharged from the reactor and allowed to cool. A sample submitted for transmission electron microscopy was found to have a uniform coating thickness of approximately 3.5 nm. The particle size was found to be 1.40 micron after 5 minutes of ultrasonic dispersion.

EXAMPLE 5

A china clay pigment extender (Supreme grade from English China Clays) with hexagonal crystals having a tabular habit and a largest dimension measuring approximately 0.25 micron, was encapsulated using the following process. The china clay was dispersed at a concentration of 400 grams per liter on a high speed impeller mill for one hour at pH 8 and in the presence of a polyacrylate dispersant (Dispex GA40) at a concentration of 0.1% by weight. One liter of the dispersed slurry was placed in a 2 liter reactor equipped with a stirrer, a condenser and inlet points for monomer and initiator. The slurry was heated to 70° C. When the temperature had stabilised, a monomer emulsion and an initiator solution were simultaneously, but separately, added over 5 hours. The monomer emulsion comprised; 11.5 g methyl methacrylate, 0.5 g methacrylic acid, 1.3 g polyacrylate dispersant (Dispex GA40) and 184 g water. The initiator solution consisted of 0.6 g of potassium persulphate in 20 ml of water.

At the end of the five hour period the material was discharged from the reactor and allowed to cool. A sample submitted for transmission electron microscopy was seen to have a uniform coating thickness of approximately 2.5 nm around the circumference of the hexagonal plates. Mottling apparent on the platelets provided evidence of encapsulation on the platey surfaces.

EXAMPLE 6

A titanium dioxide pigment coated with alumina and zirconia (TR92 from Tioxide Group Limited) with a crystal size of 0.25 micron was encapsulated using the following process. A slurry of the pigment was dispersed at 500 grams per liter on a high speed impeller mill for one hour at pH 8 in the presence of a polyacrylate dispersant (Dispex GA40) at a concentration of 0.1% by weight. One liter of the dispersed slurry was placed in a 2 liter reactor equipped with a stirrer, a condenser and inlet points for monomer and initiator. The slurry was heated to 70° C. When the temperature had stabilised, a monomer emulsion and an initiator solution were simultaneously, but separately, added over 5 hours. The monomer emulsion comprised: 14.4 g methyl methacrylate, 0.6 g methacrylic acid, 1.3 g polyacrylate dispersant (Dispex GA40) and 184 g water. The initiator solution consisted of 0.6 g of potassium persulphate in 20 ml of water.

At the end of the five hour period the material was discharged from the reactor and allowed to cool. A sample submitted for transmission electron microscopy was seen to have a generally smooth coating thickness of between 4 nm and 10 nm. The inorganic coating of the pigment was clearly visible in places within the polymer capsule and could be distinguished by the appearance of ribbons of pseudoboehmite. The particle size was found to be 0.43 micron after 1 minute of ultrasonic dispersion.

EXAMPLE 7

An uncoated titanium dioxide pigment with a crystal size of 0.25 micron, was encapsulated using the following process. A slurry of the pigment was dispersed at 500 grams per liter on a high speed impeller mill for one hour at pH 8 in the presence of a poly(sodium 4-styrene sulphonate) dispersant (0.1% by weight). One liter of the dispersed slurry was placed in a 2 liter reactor equipped with a stirrer, a condenser and inlet points for monomer and initiator. The slurry was heated to 70° C. When the temperature had stabilised, a monomer emulsion and an initiator solution were simultaneously, but separately, added over 5 hours. The monomer emulsion comprised; 14.4 g methyl methacrylate, 0.6 g methacrylic acid, 1.3 g poly(sodium 4-styrene sulphonate) dispersant and 184 g water. The initiator solution consisted of 0.6 g of potassium persulphate in 20 ml of water.

At the end of the five hour period the material was discharged from the reactor and allowed to cool. A sample submitted for transmission electron microscopy was seen to have a smooth coating of between 2 nm and 6 nm thickness.

We claim:

1. A process for producing coated inorganic particles comprising suspending particles of an inorganic powder in water at a pH value higher than the isoelectric point for the particles in the presence of a dispersing agent comprising a polymeric polybasic acid or a salt thereof to produce particles having a modified isoelectric point, reducing the pH of the dispersion to a value below 9 but above the modified isoelectric point of the particles and polymerising in the presence of the dispersion so produced an ethylenically unsaturated monomer so that said particles are coated with polymerised monomer.

2. A process according to claim 1 in which the particles are suspended in water at a pH above 7.

3. A process according to claim 1 in which the inorganic powder is titanium dioxide and the particles are suspended in water at a pH of from 9 to 11.

4. A process according to claim 1 in which the amount of dispersing agent is from 0.05 percent to 5 percent by weight with respect to inorganic powder.

5. A process according to claim 1 in which the dispersion of particles of inorganic powder is subjected to a milling process.

6. A process according to claim 1 in which the pH of the dispersion is adjusted to a value between 0.5 and 6 pH units above the modified isoelectric point.

7. A process according to claim 1 in which the inorganic powder is titanium dioxide and the pH value of the dispersion is adjusted to between 5 and 8.5.

8. A process according to claim 1 in which the ethylenically unsaturated monomer is added to the dispersion of inorganic powder as a dispersion in water.

9. A process according to claim 1 in which polymerisation is initiated by an initiator selected from the group consisting of peroxy compounds, persulphates, peracetates and redox initiators.

10. A process according to claim 9 in which the initiator is added separately but simultaneously with the monomer to the dispersion of inorganic powder.

11. A process according to claim 1 in which the ethylenically unsaturated monomer is added at a rate which is less than the rate at which the monomer is consumed by polymerisation.

12. A process according to claim 1 in which the polymerisation is carried out at a temperature of from 55° C. to 95° C.

13. A process according to claim 1 in which at least a part of the polymerisation is effected whilst the dispersion of inorganic particles is subjected to the effect of ultrasonic vibrations.

14. A process for coating inorganic particles with a polymeric material comprising the steps of:
    a) dispersing the inorganic particles in water at a pH value higher than the isoelectric point of the particles in the presence of a dispersing agent which comprises a polymeric polybasic acid or a salt thereof to produce a dispersion of particles having a surface coating of said dispersing agent and a modified isoelectric point,
    b) reducing the pH of said dispersion to a value below 9, but above the modified isoelectric point of the particles; and
    c) polymerizing in the presence of said adjusted dispersion an ethylenically unsaturated monomer so that said particles are further coated with a coherent inner coating formed from said dispersing agent and with an outer coating of polymerized monomer.

15. The process of claim 14 wherein the salt of the polymeric polybasic acid is an alkali metal salt or an ammonium salt.

16. The process of claim 14 wherein the dispersing agent is selected from the group consisting of lignosulphonates, petroleum sulphonates and polystyrene sulphonates.

17. The process of claim 14 wherein the dispersing agent is selected from the group consisting of polymaleic acids and salts, polyacrylic acids and salts, substituted acrylic acid polymers and acrylic acid copolymers and salts.

18. The process of claim 14 wherein said acid or salt thereof has a molecular weight of from about 1,000 to about 10,000 and is a substantially linear molecule.

19. The process of claim 14 wherein the inorganic particles comprise a material selected from the group consisting of titanium dioxide pigments, zinc oxide pigments, aluminum oxide pigments, antimony oxides, barium pigments, calcium pigments, zirconium pigments, chromium pigments, iron pigments, magnesium pigments, silica, silicates, aluminates and clays.

20. The process of claim 14 wherein the inorganic particles are coated with an inorganic coating.

21. The process of claim 14 wherein the inorganic particles have an average size of from about 0.01 microns to about 5 microns.

22. The process of claim 14 wherein the ethylenically unsaturated monomer is selected from the group consisting of unsaturated carboxylic acids, unsaturated carboxylic acid esters, styrene, vinyl toluene, alpha methylstyrene, ethylene, vinyl acetate, vinyl chloride, acrylonitrile and fluorinated monomers.

23. The process of claim 14 wherein the polymeric material is a film-forming polymer.

24. The process of claim 14 wherein the polymeric material is obtained from a mixture of monomers including a cross-linking agent.

25. The process of claim 14 wherein the polymeric material is present in an amount from about 0.1% to about 100%, by weight, with respect to the uncoated inorganic particles.

26. The process of claim 14 wherein the polymeric material is present in an amount such that the volume ratio of inorganic material to polymeric material is from about 1:1 to about 1:25.

* * * * *